United States Patent
Uehara et al.

(10) Patent No.: US 11,279,068 B2
(45) Date of Patent: Mar. 22, 2022

(54) INJECTION MOLDING APPARATUS

(71) Applicant: NISSEI PLASTIC INDUSTRIAL CO., LTD., Nagano-ken (JP)

(72) Inventors: Takemi Uehara, Nagano-ken (JP); Kazuyuki Okubo, Nagano-ken (JP); Hiroyuki Handa, Nagano-ken (JP); Satoru Tokida, Nagano-ken (JP)

(73) Assignee: NISSEI PLASTIC INDUSTRIAL CO., LTD.

( * ) Notice: Subject to any disclaimer, the term of this patent is extended or adjusted under 35 U.S.C. 154(b) by 0 days.

(21) Appl. No.: 16/716,749

(22) Filed: Dec. 17, 2019

(65) Prior Publication Data

US 2020/0206995 A1 Jul. 2, 2020

(30) Foreign Application Priority Data

Dec. 27, 2018 (JP) .............................. JP2018-244539

(51) Int. Cl.
*B29C 45/50* (2006.01)
*B29C 45/17* (2006.01)

(52) U.S. Cl.
CPC .. *B29C 45/5008* (2013.01); *B29C 2045/1794* (2013.01); *B29C 2045/506* (2013.01)

(58) Field of Classification Search
CPC .......... B29C 45/5008; B29C 2045/506; B29C 2045/1794; B29C 45/83; B29C 2045/5048; B29C 45/17; B29C 2045/1792
See application file for complete search history.

(56) References Cited

U.S. PATENT DOCUMENTS

| | | | | |
|---|---|---|---|---|
| 5,217,725 A * | 6/1993 | Inaba | ................... | B29C 45/5008 264/40.4 |
| 5,261,743 A * | 11/1993 | Moller | .................... | B29B 7/728 366/196 |
| 5,665,282 A * | 9/1997 | Nakamura | .......... | B29C 45/5008 264/328.1 |
| 5,911,924 A * | 6/1999 | Siegrist | ............... | B29C 45/7653 264/40.1 |
| 7,287,971 B2 * | 10/2007 | Uchiyama | ........... | B29C 45/7626 425/145 |
| 2007/0296119 A1 * | 12/2007 | Kestle | ................. | B29C 45/6728 264/328.1 |

(Continued)

OTHER PUBLICATIONS

English-language machine translation of Notice of Reasons for Refusal dated Dec. 15, 2020 in Japanese Application No. 2018-244539.

(Continued)

*Primary Examiner* — Nahida Sultana
(74) *Attorney, Agent, or Firm* — Adams & Wilks

(57) ABSTRACT

An injection molding apparatus includes an electric motor, a torque variable mechanism that changes an output torque of the electric motor, and a screw driving unit that transmits the output torque of the torque variable mechanism to a feed screw, whereby the feed screw is turned by the electric motor, the torque variable mechanism and the screw driving unit. The torque variable mechanism applies, to the feed screw, a torque equivalent to a hydraulic drive. The electric motor is interchangeable with a hydraulic motor to enable the injection molding apparatus to change between electric and hydraulic drive of the feed screw.

15 Claims, 8 Drawing Sheets

(56) References Cited

U.S. PATENT DOCUMENTS

| | | | | |
|---|---|---|---|---|
| 2007/0297273 | A1* | 12/2007 | Urban | B29C 45/5008 366/78 |
| 2008/0268091 | A1* | 10/2008 | Dantlgraber | B29C 45/5008 425/587 |
| 2011/0142982 | A1* | 6/2011 | Kitta | B29C 45/1761 425/542 |
| 2013/0237353 | A1* | 9/2013 | Scholten | H02K 11/215 474/114 |
| 2015/0336604 | A1* | 11/2015 | Urababa | B62D 5/001 180/444 |
| 2016/0185180 | A1* | 6/2016 | Schmitt | B60G 21/06 280/124.165 |
| 2016/0257337 | A1* | 9/2016 | Nitano | B62D 3/08 |

OTHER PUBLICATIONS

English-language machine translation of Japanese Publication No. 04-197616, Publication date Jul. 17, 1992.
English-language machine translation of Japanese Publication No. 2006-062108, Publication date Mar. 9, 2006.
English language machine translation of Japanese Publication No. 2013-100046, Publication date May 23, 2013.
English-language machine translation of Publication No. JP H07-119041, Publication date May 9, 1995.
English-language machine translation of Publication No. JP H10-058508, Publication date Mar. 3, 1998.

\* cited by examiner

INJECTION MOLDING APPARATUS

FIELD OF THE INVENTION

The present disclosure relates to an injection molding apparatus on the basis of a hydraulic injection molding device.

BACKGROUND

An injection molding apparatus includes main components that are a mold clamping device which clamps metal molds, and an injecting device that injects a resin material to a cavity in the clamped metal molds.

A hydraulic injection molding device conventionally known is disclosed in JP H10-58508 A.

A hydraulic injection molding device disclosed in, for example, JP H10-58508 A includes a hydraulic mold opening and closing device, a hydraulic motor that turns a screw, a hydraulic injecting cylinder that moves forward or backward the screw, and a hydraulic pump, etc.

Moreover, another hydraulic injection molding device conventionally known is disclosed in, for example, JP H7-119041 A.

The injection molding apparatus disclosed in JP H7-119041 A includes a hydraulic mold clamping cylinder, a hydraulic motor that turns a screw, and a hydraulic injecting cylinder that moves forward or backward the screw, etc.

According to the injection molding apparatus disclosed in JP H7-119041 A, mold opening starts at a time point at which an injection charging (equivalent to a metering step) is completed.

As described above, according to the conventional technologies, when the metering step is completed, a mold opening step is executed. In the metering step, hydraulic pressure generated by the hydraulic pump is supplied to the hydraulic motor, and in the mold opening step, hydraulic pressure generated by the hydraulic pump is supplied to the hydraulic mold clamping cylinder. Since the metering step and the mold opening step do not overlap in time, there is an advantage such that downsizing of the hydraulic pump can be accomplished.

In the meantime, in order to improve the productivity, conventionally, there is a demand to overlap (lay over) the mold opening step with the metering step. This is because such an overlap can reduce a cycle time and improve productivity.

In order to meet such a demand, the following two schemes may be considerable.

First, a hydraulic pump exclusive for the hydraulic motor may be added. However, because the hydraulic pump is newly added, installation costs increase, and an installation space increases.

Second, the hydraulic motor may be replaced with an electric motor.

However, in a hydraulic injection molding device that is designed with a hydraulic motor, in order to replace the hydraulic motor to an electric motor, there are difficulties to be described below.

An output-shaft speed of a hydraulic motor is slow (e.g., 160 rpm). In contrast, in order to downsize the motor, the electric motor is designed to be fast-speed, and thus an output-shaft speed becomes fast (e.g., 1980 rpm). The term rpm is a number of turns per a minute (the same is true in the following).

It is necessary to attach a reducer to the electric motor.

There are two kinds of reducers: a continuously variable transmission; and a non-continuously variable transmission. The continuously variable transmission has a complicated structure, and needs costs for maintenance service. The non-continuously variable transmission, in particular, a gear-type reducer, has a quite simple structure, thus preferred.

As for gear-type reducers, a general gear-type reducer is inexpensive and has an assured mechanical performance.

However, in the case of the general gear-type reducer, since a difference between the flange at the hydraulic-motor side and the flange at the reducer-side, and differences in diameter and length between the output shaft of the hydraulic motor and that of the reducer inevitably occur, it is not directly applicable.

Accordingly, a gear-type reducer with a customized specification becomes requisite, but the gear-type reducer with a customized specification is a so-called one-off component, thus expensive.

Although inexpensive injection molding apparatus are desired, a technology of in an injection molding apparatus on the basis of a hydraulic injection molding device, enabling replacement of a hydraulic motor with an electric motor provided with a reducer is demanded.

In addition, a technology of causing the number of reducers utilized at a plurality of injection volumes to be one is also demanded.

SUMMARY OF THE INVENTION

An objective of the present disclosure is to provide a technology of, in an injection molding apparatus, enabling replacement of a hydraulic motor with an electric motor provided with a reducer.

According to a first embodiment of the present disclosure is an injection molding apparatus, and the apparatus includes:

an electric motor;
a torque variable mechanism that changes output torque by the electric motor; and
  a screw driving unit that transmits the output torque by the torque variable mechanism to a screw,
  wherein the screw is turned by the electric motor, the torque variable mechanism, and the screw driving unit,
  wherein the torque variable mechanism applies, to the screw, torque equivalent to a hydraulic drive,
  wherein at least an injecting cylinder axially moves the screw,
  wherein an in injecting device moving cylinder is connected to linearly move the electric motor, the torque variable mechanism, the screw driving unit, and the screw together as a unit, and
  wherein a hydraulic pump and hydraulic piping supplies hydraulic pressure to injecting cylinder and the injecting device moving cylinder.

According to the present disclosure, the injection molding apparatus is provided with the electric motor and the torque variable mechanism, and the torque variable mechanism applies, to the screw, torque equivalent to a hydraulic drive.

According to the present disclosure, a technology capable of replacing, in the injection molding apparatus on the basis of a hydraulic injection molding device, a hydraulic motor with the electric motor that includes the reducer is provided.

Preferably, the torque variable mechanism includes:
a gear-type reducer; and
a pre-reduction mechanism provided between the gear-type reducer and the electric motor, wherein the pre-reduction mechanism includes:

a first toothed pulley attached to a motor shaft of the electric motor;

a second toothed pulley attached to an input shaft of the gear-type reducer; and a toothed belt tensioned between the first and second toothed pulleys.

By adjusting the reduction ratio of the gear-type reducer by the pre-reduction mechanism, output torque by the gear-type reducer can match output-shaft torque by a hydraulic motor, and thus application of the gear-type reducer is enabled.

A value obtained by dividing necessary output torque by the total reduction ratio becomes the torque by the electric motor. In comparison with a case in which reduction is carried out only by the gear-type reducer, when the pre-reduction mechanism is added to the gear-type reducer, the torque by the electric motor can be reduced, enabling a downsizing of the electric motor.

According to the present disclosure, capable of replacing, in the injection molding apparatus on the basis of a hydraulic injection molding device, a hydraulic motor with the electric motor that includes the gear-type reducer is provided.

Moreover, if the gear-type reducer is selected in accordance with the injection volume of the base hydraulic injection molding device, the kinds of the gear-type reducer increase.

In this point, according to the present disclosure, by changing the pulley diameter of the toothed pulley, it becomes possible to cope with a change in injection volume by a single gear-type reducer.

That is, according to the present disclosure, a technology enabling the number of reducers applied at the plurality of injection volumes to be one is provided.

Preferably, the above-described injection molding apparatus further includes an adapter which is provided between the gear-type reducer and the screw driving unit, and which includes: a cylindrical portion; and flanges provided at both ends of the cylindrical portion, respectively, wherein the one flange of the adapter is formed in the same shape as a shape of a flange of a hydraulic motor, and wherein the other flange of the adapter is formed in the same shape as a shape of a flange of the gear-type reducer.

Since the apparatus is on the basis of the hydraulic injection molding device, the screw driving unit is provided with the flange corresponding to the flange of the hydraulic motor. This flange and the flange of the gear-type reducer are mechanically coupled to each other by the adapter.

Preferably, an output shaft of the gear-type reducer and the screw driving unit are coupled to each other by a shaft coupling.

By providing the shaft coupling therebetween, the output shaft of the gear-type reducer can be freely in any shape, and thus a cost increase for the gear-type reducer can be suppressed.

Several preferable embodiments of the present disclosure will be described in detail with reference to the accompanying figures in which.

DETAILED DESCRIPTION OF THE EMBODIMENTS

Figure 1:
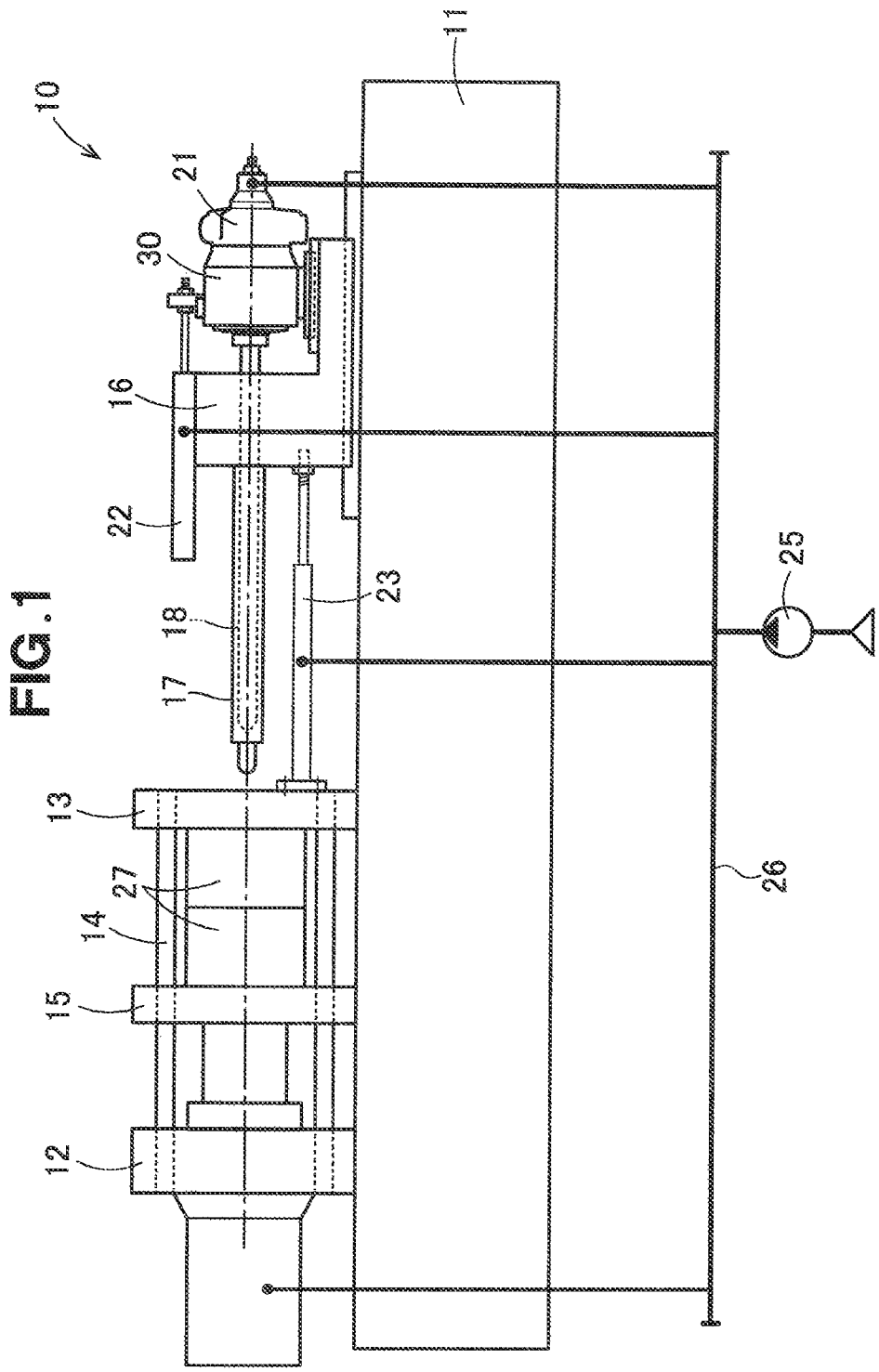
FIG. 1 is a side view of a base hydraulic injection molding device.

As illustrated in FIG. 1, a base hydraulic injection molding device 10 includes a bed 11, a mold clamping cylinder 12, a fixed mount 13, a tie bar 14, a movable mount 15, a moving mount 16, a heating cylinder 17, a screw 18, a screw driving unit 30, a hydraulic motor 21, an injecting cylinder 22, an injecting device moving cylinder 23, a hydraulic pump 25, and a hydraulic piping 26.

The mold clamping cylinder 12 and the fixed mount 13 are fastened to the bed 11.

The tie bar 14 is extended so as to connected to the mold clamping cylinder 12 and to the fixed mount 13.

The movable mount 15 is installed between the mold clamping cylinder 12 and the fixed mount 13 so as to be movable along the tie bar 14.

The moving mount 16 is mounted on the bed 11 so as to be movable outside the fixed mount 13.

The heating cylinder 17 is supported by the moving mount 16, and is extended toward the fixed mount 13.

The screw 18 is retained in the heating cylinder 17 so as to be movable in the axial direction and turnable therearound.

The screw driving unit 30 is coupled to the base of the screw 18.

The hydraulic motor 21 constitutes a hydraulic motor driving unit that is detachably connectable to the screw driving unit 30.

The injecting cylinder 22 is connected to the screw driving unit 30 and mounted on the moving mount 16.

The injecting device moving cylinder 23 is connected to the fixed mount 13 and to the moving mount 16.

By hydraulic pressure generated by the hydraulic pump 25, the screw 18 is turned by the hydraulic motor 21 to perform a metering step, and metal molds 27 are clamped by the mold clamping cylinder 12.

By the hydraulic pressure, the injecting device moving cylinder 23 jointly moves the heating cylinder 17, the screw 18, the moving mount 16, the screw driving unit 30, and the hydraulic motor 21 together as a unit.

This movement causes the nozzle of the heating cylinder 17 to touch the metal mold 27. A melted resin material is injected into the cavity in the metal molds 27 by moving forward the screw 18 by the injecting cylinder 22.

After the injection completes, cooling of the resin material and measurement thereof simultaneously start.

After the resin material is cured, the metal molds 27 are opened by the mold clamping cylinder 12, and an ejector is moved forward and backward to take out a molded product. According to the base hydraulic injection molding device 10, after the metering step by the hydraulic motor 21 is completed, the mold clamping cylinder 12 opens and closes the molds. Since the mold opening and the metering step are not performed simultaneously, the hydraulic pump 25 can be suppressed to an appropriate volume. However, a cycle time is extended.

Note that the rotating speed of the hydraulic motor 21 is the same as the value as described with reference to conventional technologies (e.g., 160 rpm).

Figure 2:
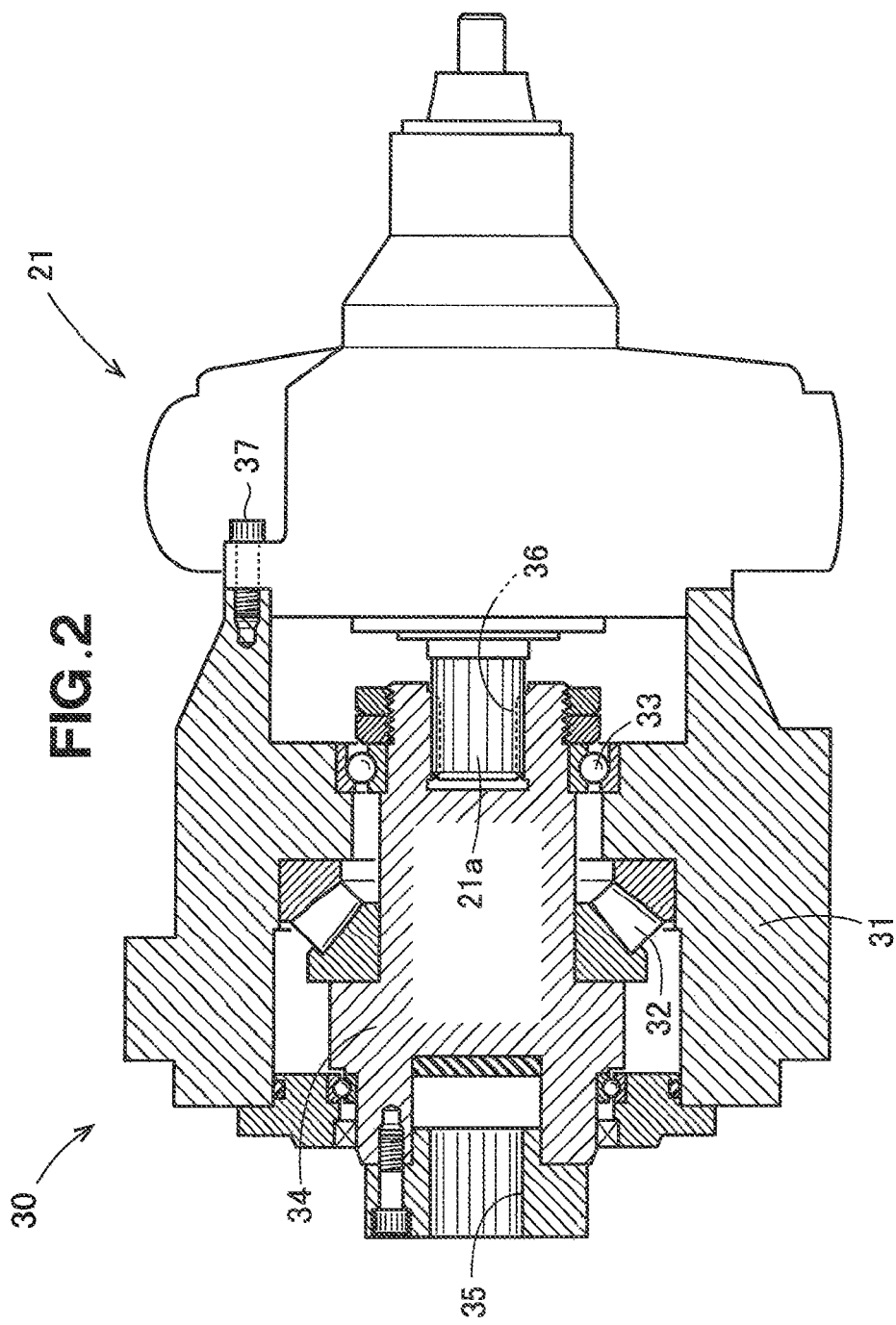
FIG. 2 is a cross-sectional view of a screw driving unit.

As illustrated in FIG. 2, the screw driving unit 30 includes, for example, a casing 31, and a relay shaft 34 attached to this casing 31 via bearings 32 and 33 so as to be freely turnable.

A spline opening 35 with which the base of the screw (reference numeral 18 in FIG. 1) can be engage is provided in an end of the relay shaft 34. A spline opening 36 with which an output shaft 21a of the hydraulic motor 21 is engaged is provided in the other end of the relay shaft 34.

Figure 3:
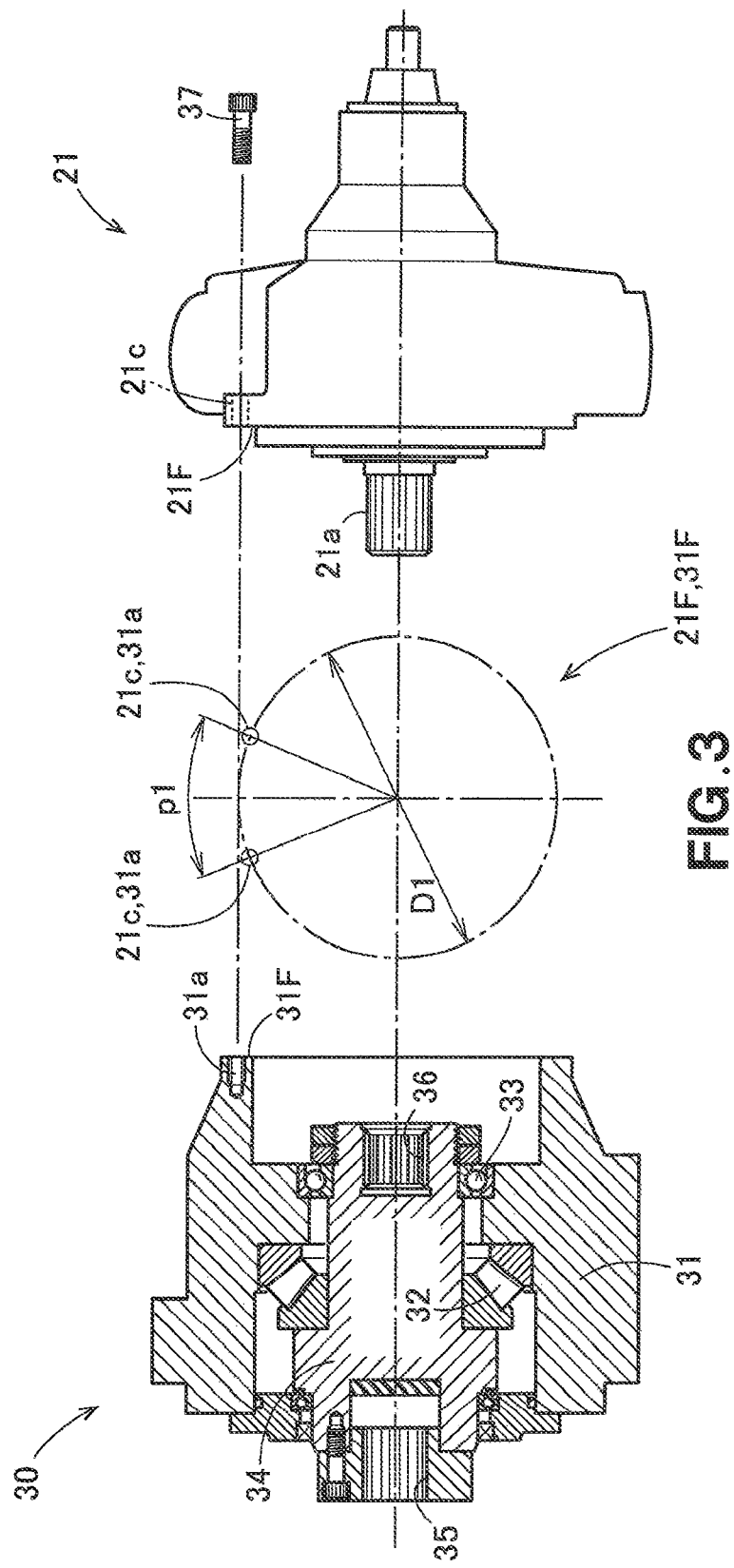
FIG. 3 is a diagram illustrating a state in which a hydraulic motor is detached from the screw driving unit.

As illustrated in FIG. 3, when bolts 37 are loosened, the hydraulic motor 21 can be detached from the screw driving unit 30.

When such a motor is detached, a flange 21F of the hydraulic motor 21 is exposed. Bolt holes 21c are provided in this flange 21F. A pitch diameter of the bolt holes 21c in the flange 21F is D1, and a pitch is p1.

Moreover, by detaching the hydraulic motor 21 from the screw driving unit 30, a flange 31F of the screw driving unit 30 is exposed. Female screws 31a are provided in this flange 31F. A pitch diameter of the female screws 31a in the flange 31F is D1, and a pitch is p1.

When the pitch diameter and the pitch are consistent in this way, it can be said that the flange 21F is in the same shape as that of the flange 31F (the same is true in the following description).

Figure 4:
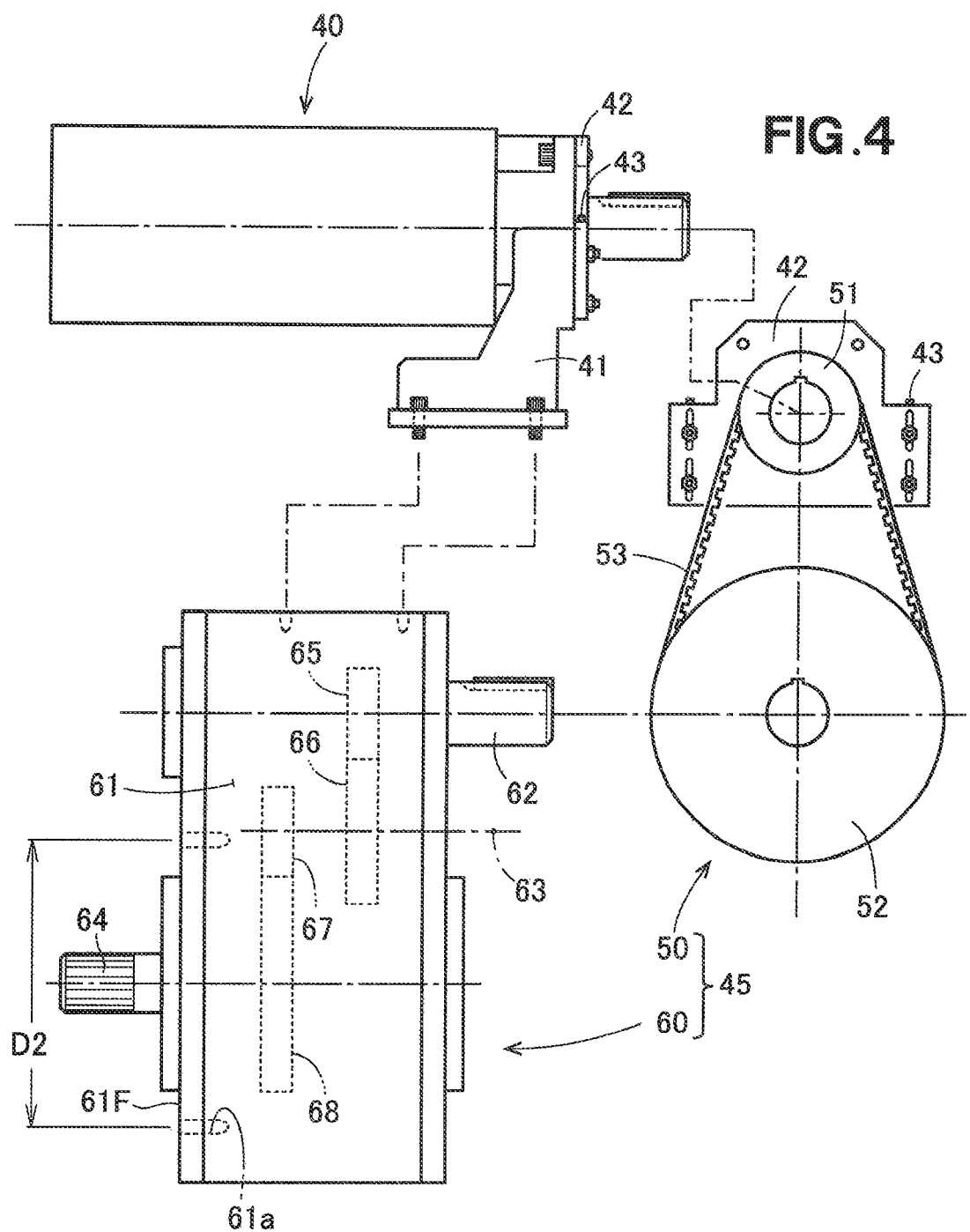
FIG. 4 is a conceptual diagram of an electric motor, a pre-reduction mechanism, and a gear-type reducer.

As illustrated in FIG. 4, an electric motor 40 and a torque variable mechanism 45 are prepared. The torque variable mechanism 45 has a role of applying, to the screw (reference numeral 18 in FIG. 1), torque that is equivalent to a hydraulic drive (the hydraulic motor 21).

The torque variable mechanism 45 includes, for example, a pre-reduction mechanism 50, and a gear-type reducer 60.

It is preferable that the electric motor 40 should be a servo motor. This electric motor 40 can be attached to an upper surface of the gear-type reducer 60 using a bracket 41 and a tensioner metal fitting 42 both in an appropriate shape.

Note that the tensioner metal fitting 42 includes a jack bolt 43, and the tension (tensile force) of a toothed belt 53 can be adjusted by this jack bolt 43.

The pre-reduction mechanism 50 includes a pair of toothed pulleys 51 and 52, and the toothed belt 53 tensioned between the pair of toothed pulleys 51 and 52. Although the number of teeth on the toothed pulleys 51 and 52 is optional, for example, the toothed pulley 51 at the electric-motor-40 side has 42 gear teeth, and the toothed pulley 52 at the gear-type-reducer 60 side has 64 gear teeth. In this case, the reduction ratio of the pre-reduction mechanism 50 becomes 64/42=1.52.

If the 64 gear teeth are changed to 65 gear teeth, the reduction ratio becomes 65/42=1.55. Based on a calculation that is (1.55−1.52)/1.52=0.02, the reduction ratio is changed by 2% by changing one gear tooth. When the number of teeth is changed, by changing the shaft distance between the motor shaft of the electric motor 40 and an input shaft 62 of the gear-type reducer 60 by the jack bolt 43, an appropriate tension on the toothed belt 53 is achievable. That is, according to the pre-reduction mechanism 50, the shaft distance between the motor shaft and the input shaft 62 can be quite easily changed.

The toothed pulleys 51 and 52 may be flat pulleys or V-belt pulleys, respectively, and the toothed belt 53 may be a flat belt or a V-belt. The flat belt and the V-belt have a simple structure, and are inexpensive.

However, in the case of the flat belt or the V-belt, a slip is likely to occur relative to the belt pulley. In this point, the toothed pulleys 51 and 52 and the toothed belt 53 can suppress such a slip, thus further preferable.

The gear-type reducer 60 includes a reducer casing 61, the input shaft 62, an intermediate shaft 63 and an output shaft 64 which are attached to this reducer casing 61 so as to be freely turnable, a first small-diameter gear 65 attached to the input shaft 62, a first large-diameter gear 66 and a second small-diameter gear 67 attached to the intermediate shaft 63, and a second large-diameter gear 68 attached to the output shaft 64.

A first-stage reduction ratio is obtained between the first small-diameter gear 65 and the first large-diameter gear 66, and a second-stage reduction ratio is obtained between the second small-diameter gear 67 and the second large-diameter gear 68.

A product of the first-stage reduction ratio and the second-stage reduction ratio becomes the reduction ratio of the gear-type reducer 60. The reduction ratio of the gear-type reducer 60 is, for example, 8.145.

Note that a flange 61F is provided on the reducer casing 61 so as to surround the output shaft 64. The pitch diameter of female screws 61a in this flange 61F is D2, and a pitch is p2.

When the rotating speed of the electric motor 40 is 1980 rpm, the rotating speed of the output shaft 64 of the gear-type reducer 60 becomes 160 rpm by a calculation of 1980/1.52/8.145=160. This 160 rpm matches the rotating speed of the hydraulic motor (reference numeral 21 in FIG. 1).

Note that the torque changes in proportional to the reduction ratio.

When the output torque of the electric motor 40 is Tm, the output torque by the gear-type reducer 60 becomes (Tm× 1.52×8.145=12.3×Tm), and the output torque by the gear-type reducer 60 can match the output torque by the hydraulic motor.

Because a shaft distance between the input shaft 62 and the intermediate shaft 63 is fixed although the reduction ratio of the gear-type reducer 60 can be changed by changing the number of teeth, when, for example, the number of teeth of the first small-diameter gear 65 is increased by 1, the number of teeth of the first large-diameter gear 66 is reduced by 1. Consequently, the first reduction ratio increases substantially 5%. This substantially 5% is sufficiently larger than substantially 2% at the pre-reduction mechanisms 50.

When increased by 5%, the reduction ratio of the gear-type reducer 60 becomes 8.552 subsequent to 8.145, and thus the above-described adjustment of output torque becomes difficult.

In this point, by providing the pre-reduction mechanism 50, the reduction ratio of the gear-type reducer 60 can be adjusted by the reduction ratio of the pre-reduction mechanism 50, facilitating adjustment of the output torque.

Figure 5:
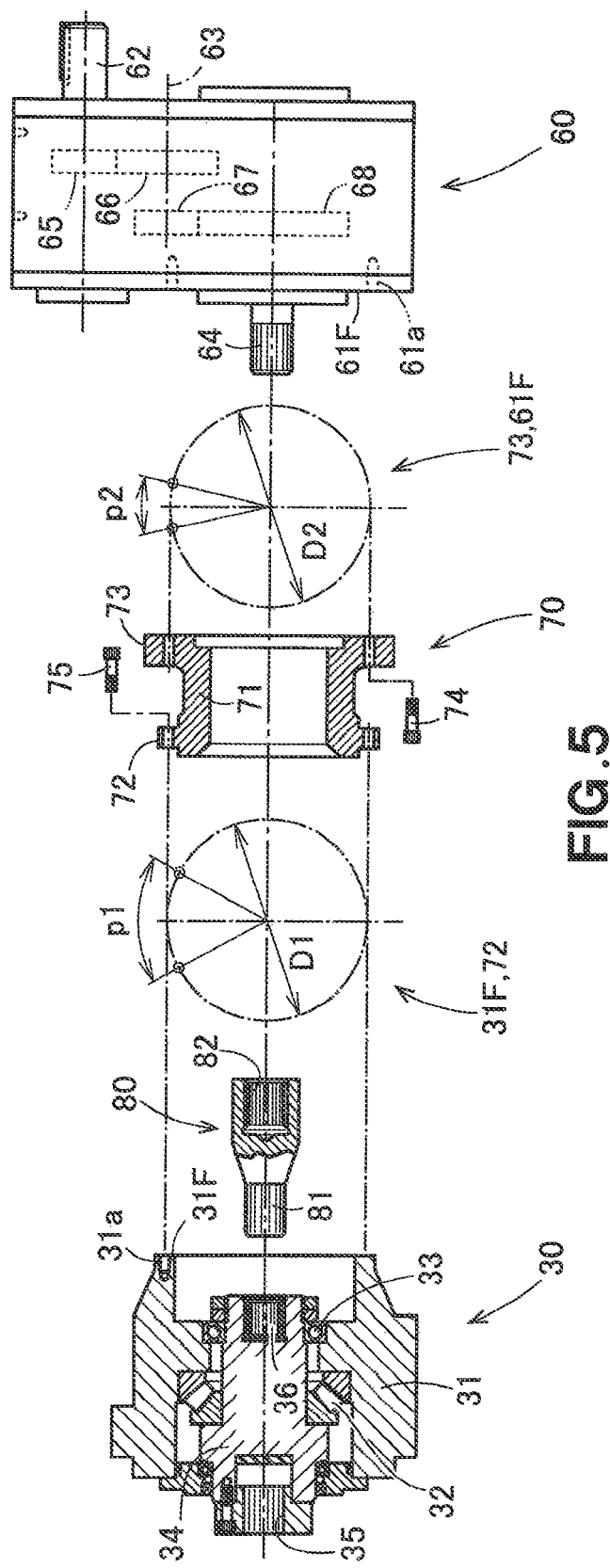
FIG. 5 is a conceptual diagram of an adapter and a shaft coupling.

As illustrated in FIG. 5, an adapter 70 and a shaft coupling 80 are prepared.

The adapter 70 includes a cylindrical portion 71, and flanges 72 and 73 provided on both ends of this cylindrical portion 71, respectively.

The one flange 72 of this adapter 70 is formed in the same shape as that of the flange 31F of the screw driving unit 30.

The other flange 73 of the adapter 70 is formed in the same shape as that of the flange 61F of the gear type reducer 60.

Note that as described with reference to FIG. 3, both the flange 31F of the screw driving unit 30 and the flange 21F of the hydraulic motor 21 have the pitch diameter that is D1 and have the pitch p1, and are formed in the same shape.

Moreover, the shaft coupling 80 includes, at one side, a spline shaft 81 to be engaged with the spline opening 36 of the screw driving unit 30, and includes, at the other side, a spline opening 82 with which the output shaft 64 of the gear-type reducer 60 is engaged.

Although how to assemble is optional, for example, the shaft coupling 80 is attached to the output shaft 64 of the gear-type reducer 60. The adapter 70 is attached to the gear-type reducer 60 by a bolt 74. In this embodiment, the electric motor 40, the torque variable mechanism 45, the adapter 70 and the shaft coupling 80 constitute an electric motor driving unit that is detachably connectable to the screw driving unit 30.

Next, the gear-type reducer 60 is moved, the shaft coupling 80 is attached to the screw driving unit 30, and the adapter 70 is caused to be in contact with the screw driving unit 30 and fastened by a bolt 75.

Figure 6:
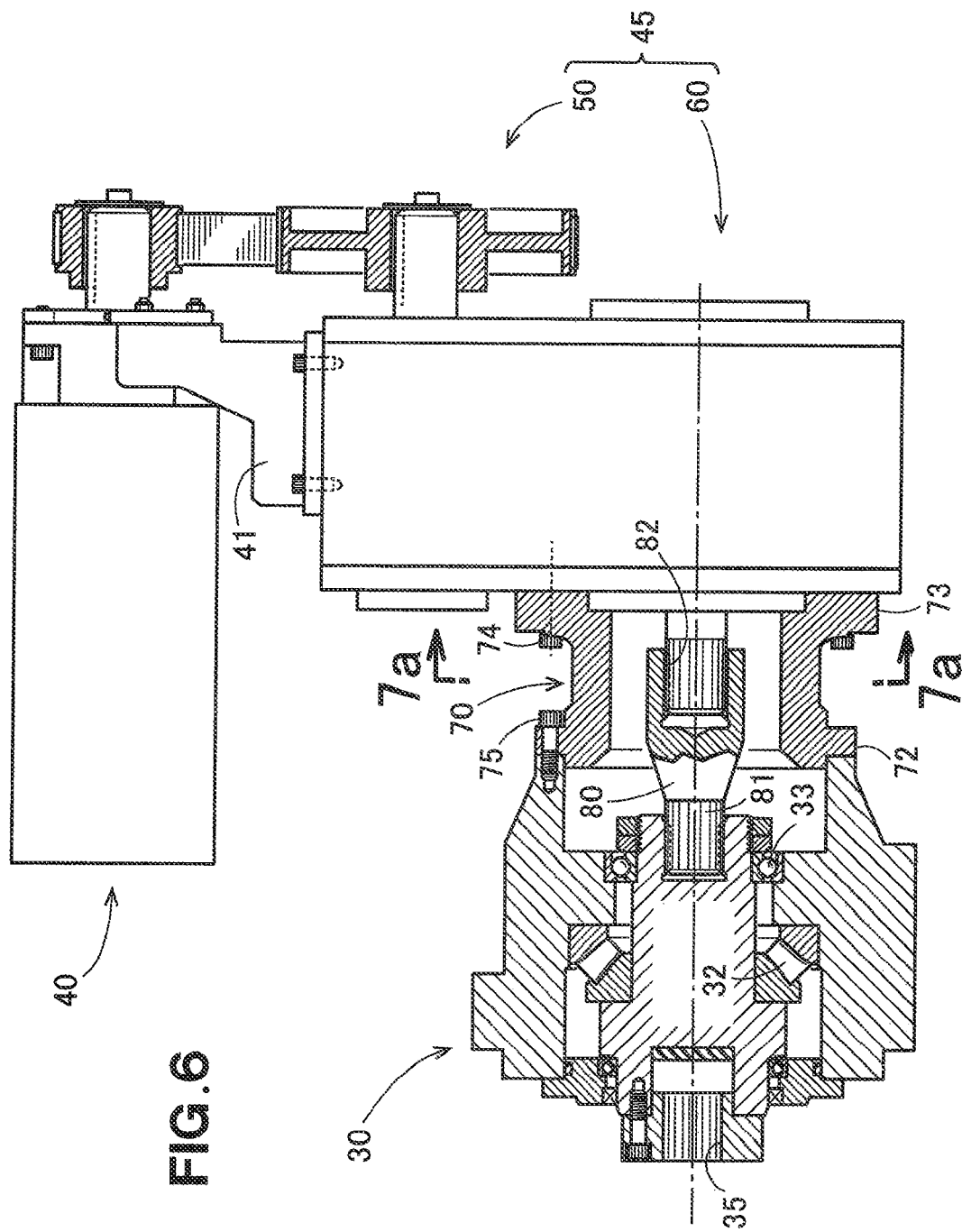
FIG. 6 is an assembling diagram of the electric motor, the pre-reduction mechanism, the gear-type reducer, and the screw driving unit.

As illustrated in FIG. 6, the pre-reduction mechanism 50 and the electric motor 40 are attached to the gear-type reducer 60. There is no technical problem that the pre-reduction mechanism 50 and the electric motor 40 are attached to the gear-type reducer 60 in advance.

Next, a transparent or a substantially transparent lubricating oil (reference numeral 99 in FIGS. 7A and 7B) is applied in the screw driving unit 30 and in the adapter 70. This lubricating oil lubricates the bearing 32 and 33, the spline shaft 81, and the spine opening 82, etc.

In the meantime, although many shafts are supported by bearings, the shaft coupling 80 is not supported by a bearing.

In comparison with a structure in which such a coupling is supported by a bearing, according to the structure in which such a coupling is not supported by a bearing, a wear may occur when used for a long time. More specifically, the grooves in the spline opening and the protrusions of the spline shaft cause frictions with each other.

The level of wear remains in an allowable range. However, it is appropriate to take measures. Example measures will be described with reference to FIGS. 7A and 7B.

Figure 7A:
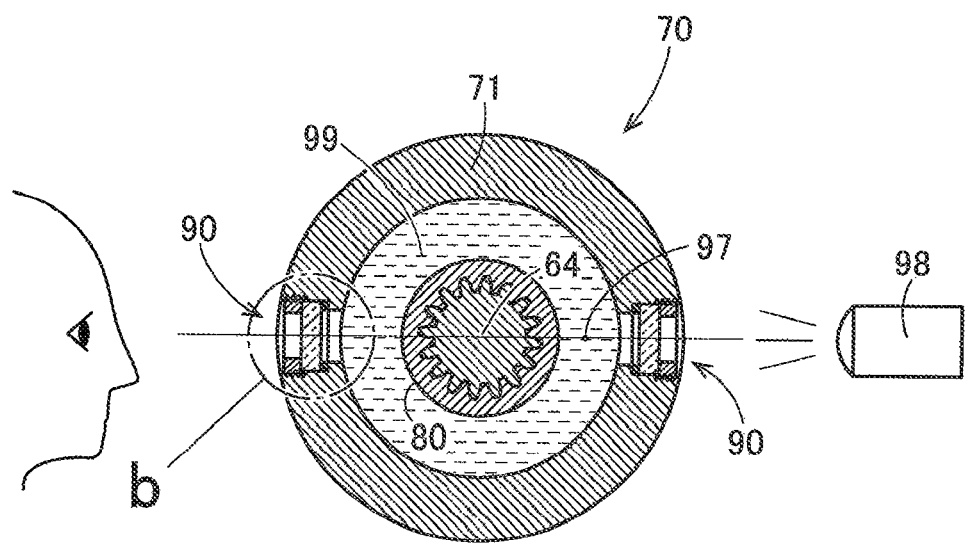
FIG. 7A is a cross-sectional view taken along a line 7a-7a in FIG. 6.
Figure 7B:
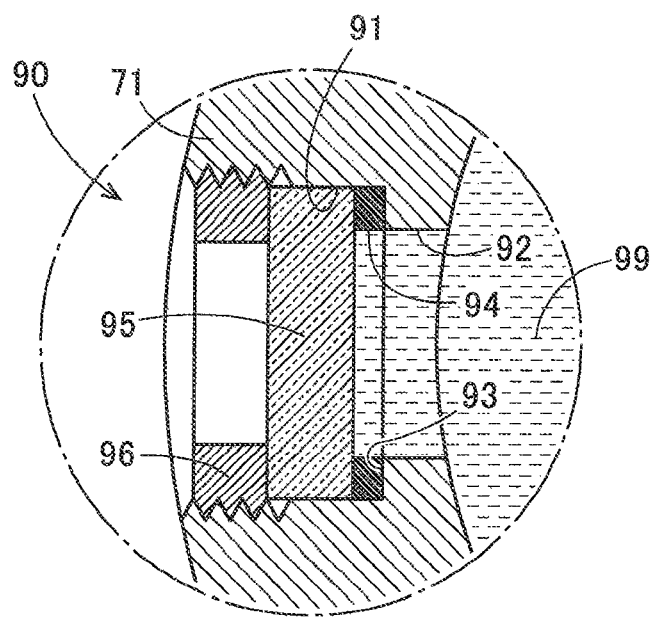
FIG. 7B is an enlarged view of a section b in FIG. 7A.

As Illustrated in FIG. 7B, inspection windows 90 each include a hole 91 in an appropriate size provided in the cylindrical portion 71, a hole 92 that has a slightly smaller diameter than that of the hole 91, a gasket 94 that is in contact with a step 93 formed between the hole 91 and the hole 92, a glass (or transparent resin) plate 95 that is in contact with the gasket 94, and a ring nut 96 that retains this glass plate 95.

One, two or equal to or greater than three inspection windows 90 each employing such a structure are provided in the cylindrical portion 71. However, when the number is increased, the structure of the adaptor 70 becomes complicated, thus not preferable.

As illustrated in FIG. 7A, it is recommended to provide the right and left two inspection windows 90 on a line 97 that passes through the center. Light from a lamp 98 is guided into the one inspection window 90, and visual inspection is enabled from the other inspection window 90.

If a wear on the shaft coupling 80 advances, worn powders are dispersed in the lubricating oil 99, and the lubricating oil 99 becomes dirty. This can be inspected from the inspection window 90.

Figure 8:
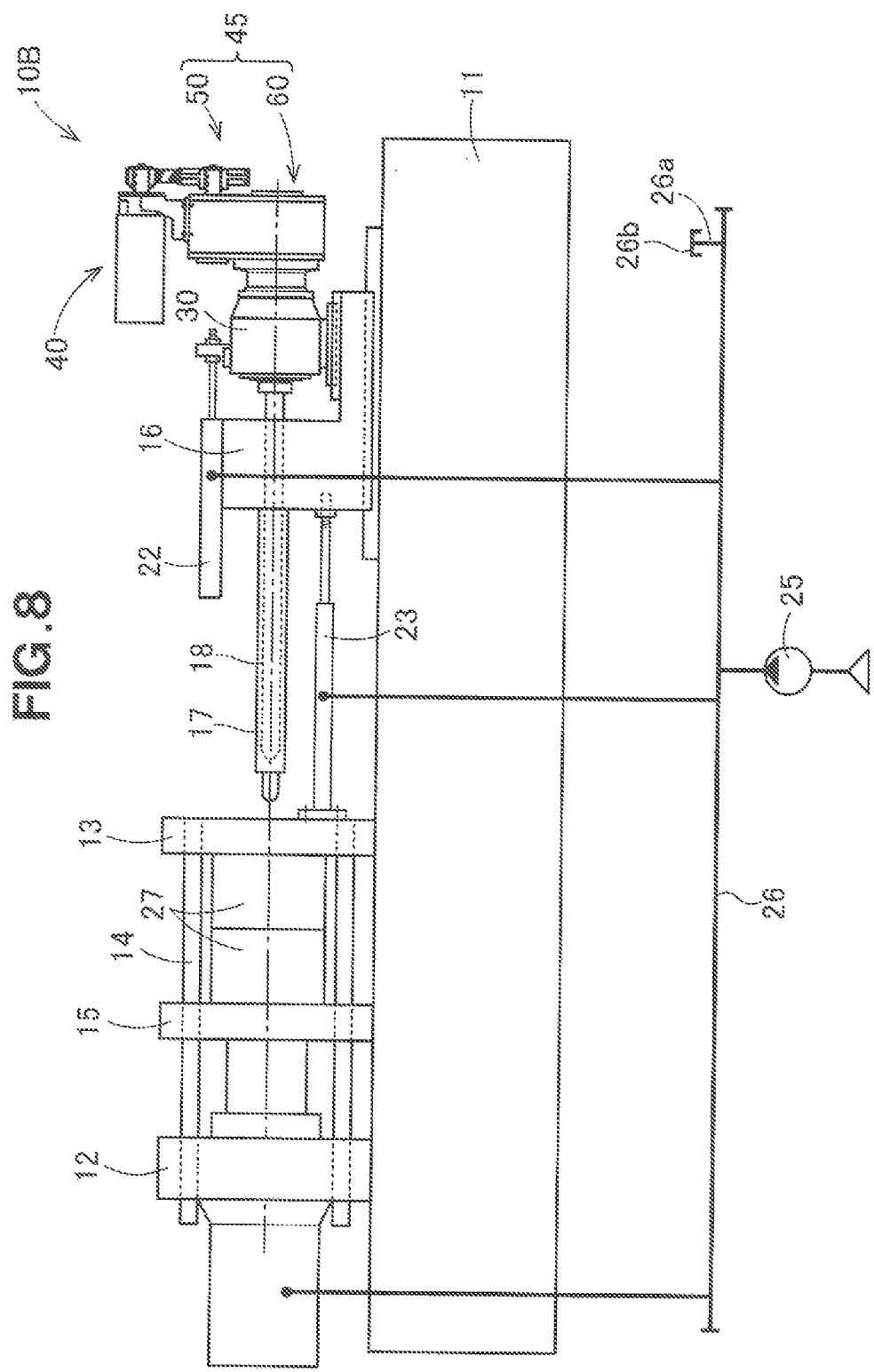
FIG. 8 is a side view of an injection molding apparatus according to the present disclosure.

An injection molding apparatus 10B based on the hydraulic injection molding device as illustrated in FIG. 8 is achieved as described above. That is, since this injection molding apparatus 10B turns the screw 18 by the electric motor 40, the operation of the mold clamping cylinder 12 by hydraulic pressure and the metering step performed by the electric motor 40 can be executed simultaneously and concurrently.

The hydraulic piping 26 shown in FIG. 8 is provided with a short branch piping 26a for a hydraulic motor, and the short branch piping is closed with a cap 26b.

According to the present disclosure, since the hydraulic pump 25 and the hydraulic piping 26 are left, there is also an advantage such that the structure in FIG. 8 can be returned to the structure in FIG. 1 in any time.

The present disclosure is applicable to both the case in which the injection molding apparatus 10B is newly constructed, and the case in which an existing machinery is reconstructed to obtain the injection molding apparatus 10B.

When Injection Molding Apparatus 10B is Newly Constructed:

The injection molding apparatus 10B as illustrated in FIG. 8 can be obtained by simply adding drawings of the adapter 70, the shaft coupling 80, the gear-type reducer 60, the pre-reduction mechanism 50, and the electric motor 40 to a design drawing of the hydraulic injection molding device 10 as illustrated in FIG. 1, and thus a load on designing is remarkably reduced.

When Injection Molding, Apparatus 10B is Obtained by Reconstruction:

The hydraulic meter 21 is detached from the hydraulic injection molding device 10 as illustrated in FIG. 1, and the injection molding apparatus 10B as illustrated in FIG. 8 can be obtained by simply attaching the adapter 70, the shaft coupling 80, the gear-type reducer 60, the pre-reduction mechanism 50, and the electric motor 40, and thus machinery costs can be remarkably reduced.

Note that according to the embodiment, although the spline shaft 81 is provided at the one end of the shaft coupling 80, and the spline opening 82 is provided in the other end, the is no technical problem such that both ends may be respective spline shafts or both ends may be respective spline openings. The spline shaft 81 may be a shaft with a key, and the spline opening 82 may be an opening with a key.

What is necessary is that the shape of the shaft coupling 80 is decided in accordance with the shape of the relay shaft 34 of the screw driving unit 30, and the shape of the output shaft 64 of the gear-type reducer 60.

Moreover, the torque variable mechanism 45 may be a mechanism capable of applying torque equivalent to a hydraulic drive to the screw, and can be constructed only by a continuously variable transmission, and thus not limited to the pre-reduction mechanism 50 and the gear-type reducer 60.

What is claimed is:
1. An injection molding apparatus comprising:
an electric motor that produces an output torque;
a torque variable mechanism that changes the output torque produced by the electric motor to an output torque equivalent to that produced by a hydraulic drive;
a screw driving unit connected to transmit the output torque produced by the torque variable mechanism to a screw, whereby the screw is turned by the electric motor, the torque variable mechanism, and the screw driving unit;
an injecting cylinder connected to axially move the screw;
an injecting device moving cylinder connected to jointly move the electric motor, the torque variable mechanism, the screw driving unit, and the screw together as a unit; and a hydraulic pump and hydraulic piping for supplying hydraulic pressure to the injecting cylinder and the injecting device moving cylinder, the hydraulic pump being driven by means other than the electric motor.

2. The injection molding apparatus according to claim 1, wherein the torque variable mechanism comprises:
a gear reducer; and
a pre-reduction mechanism provided between the gear reducer and the electric motor, and
wherein the pre-reduction mechanism comprises:
a first toothed pulley attached to a motor shaft of the electric motor;
a second toothed pulley attached to an input shaft of the gear reducer; and
a toothed belt tensioned between the first and second toothed pulleys.

3. The injection molding apparatus according to claim 2, further comprising an adapter provided between the gear reducer and the screw driving unit, the adapter comprising a cylindrical portion, and flanges provided at both ends of the cylindrical portion, respectively,
wherein one flange of the adapter is formed in the same shape as a shape of a flange of a hydraulic motor, and
wherein the other flange of the adapter is formed in the same shape as a shape of a flange of the gear reducer.

4. The injection molding apparatus according to claim 2, wherein an output shaft of the gear reducer and the screw driving unit are coupled to each other by a shaft coupling.

5. The injection molding apparatus according to claim 3, wherein an output shaft of the gear reducer and the screw driving unit are coupled to each other by a shaft coupling.

6. The injection molding apparatus according to claim 3, wherein two inspection windows are provided in the cylindrical portion.

7. The injection molding apparatus according to claim 1, wherein branch piping is provided in the hydraulic piping to enable replacement of the electric motor and the torque variable mechanism with a hydraulic motor.

8. In an injection molding apparatus having a rotatable feed screw for feeding melted resin material to a mold cavity:
a screw driving unit connected to rotationally drive the feed screw, the screw driving unit comprising a casing, and a relay shaft freely rotatable in the casing and having a driving end connected to the feed screw and a driven end;
an electric motor driving unit detachably connectable to the casing and, when connected, engaging with the driven end of the relay shaft for rotationally driving the relay shaft; and
a hydraulic motor driving unit detachably connectable to the casing and, when connected, engaging with the driven end of the relay shaft for rotationally driving the relay shaft,
wherein one of the electric motor driving unit and the hydraulic motor driving unit is detachably connected to the casing and is interchangeable with the other of the electric motor driving unit and the hydraulic motor driving unit to change between electric drive and hydraulic drive of the feed screw.

9. The injection molding apparatus according to claim 8; wherein the hydraulic motor driving unit comprises a hydraulic motor that produces an output torque; and the electric motor driving unit comprises an electric motor that produces an output torque, and a torque variable mechanism that varies the output torque produced by the electric motor to correspond to that produced by the hydraulic motor.

10. The injection molding apparatus according to claim 9; further comprising an injecting cylinder connected to axially advance and retract the feed screw; an injecting device moving cylinder connected to jointly move, as a unit, the feed screw, the injecting cylinder, the screw driving unit, and whichever one of the electric motor driving unit or the hydraulic motor driving unit is connected to the casing of the screw driving unit; and a hydraulic pump and hydraulic piping for supplying hydraulic pressure to the injecting cylinder and the injecting device moving cylinder.

11. The injection molding apparatus according to claim 10; wherein the hydraulic piping includes branch piping for use in supplying hydraulic pressure to the hydraulic motor when the hydraulic motor driving unit is connected to the casing of the screw driving unit.

12. The injection molding apparatus according to claim 10; wherein the electric motor driving unit includes an adapter connected to the torque variable mechanism, the adapter comprising a cylindrical portion, and inspection windows provided in the cylindrical portion.

13. The injection molding apparatus according to claim 12; wherein the electric motor driving unit includes a shaft coupling that couples together an output shaft of the torque variable mechanism and the screw driving unit when the electric motor driving unit is connected to the casing of the screw driving unit.

14. The injection molding apparatus according to claim 9; wherein the electric motor driving unit includes an adapter connected to the torque variable mechanism, the adapter comprising a cylindrical portion, and inspection windows provided in the cylindrical portion.

15. The injection molding apparatus according to claim 9; wherein the electric motor driving unit includes a shaft coupling that couples together an output shaft of the torque variable mechanism and the screw driving unit when the electric motor driving unit is connected to the casing of the screw driving unit.

* * * * *